United States Patent [19]

Mouché et al.

[11] Patent Number: 4,681,687

[45] Date of Patent: Jul. 21, 1987

[54] USE OF ALKALI METAL NITRITES TO INHIBIT H₂S FORMATION IN FLUE GAS DESULFURIZATION SYSTEM SLUDGES

[75] Inventors: Richard J. Mouché, Batavia; Peter Song, Midlothian, both of Ill.

[73] Assignee: Nalco Chemical Company, Naperville, Ill.

[21] Appl. No.: 920,476

[22] Filed: Oct. 20, 1986

[51] Int. Cl.⁴ ............................................... C02F 1/50
[52] U.S. Cl. .................................. 210/764; 210/916; 422/28; 422/5
[58] Field of Search .............. 210/749, 758, 764, 916; 424/127; 422/28, 5; 71/65, 66, 67

[56] References Cited

U.S. PATENT DOCUMENTS

| | | | |
|---|---|---|---|
| 652,686 | 6/1900 | Perry | 71/66 |
| 2,080,378 | 5/1937 | Quinn | 71/65 |
| 4,105,552 | 8/1976 | Hunsucker et al. | 210/764 |
| 4,119,537 | 10/1976 | Finkelstein | 210/764 |
| 4,285,764 | 8/1981 | Pera et al. | 210/764 |
| 4,295,932 | 10/1981 | Pocius | 210/764 |
| 4,393,037 | 7/1983 | Delaney et al. | 210/764 |
| 4,495,200 | 1/1985 | Lindstrom et al. | 210/764 |
| 4,496,534 | 1/1985 | Delaney et al. | 210/764 |
| 4,532,117 | 7/1985 | Delaney | 210/764 |
| 4,595,591 | 6/1986 | Mardi et al. | 424/127 |

FOREIGN PATENT DOCUMENTS 0981244 12/1982 U.S.S.R. .............................. 210/764

OTHER PUBLICATIONS

Kobayashi et al, Biochemical Studies on Sulfate-Reducing Bacteria, 1974, pp. 519–529, J. Biochem., 75(3).
Denitrifying Bacteria Can Be Enumerated in Nitrite Broth, Author M. G. Volz, Soil Sci. Soc. Am. Journal, 41(3), 549-51, 1977.
Effect of Nitrate on Biogenic Sulfide Production, Authors: Gary E. Jenneman, M. J. McInerney & Roy M. Knapp, Applied & Environmental Microbiology, Jun. 1986, vol. 51, No. 6, pp. 1205–1211.

*Primary Examiner*—Peter Hruskoci
*Assistant Examiner*—Coreen Y. Lee
*Attorney, Agent, or Firm*—John G. Premo; Anthony L. Cupoli; Donald G. Epple

[57] ABSTRACT

Alkali metal nitrite controls sulfate-reducing bacteria and odors in flue gas desulfurization scrubber sludges.

3 Claims, No Drawings

USE OF ALKALI METAL NITRITES TO INHIBIT H₂S FORMATION IN FLUE GAS DESULFURIZATION SYSTEM SLUDGES

INTRODUCTION

Flue gas desulfurization (FGD) sludges become highly contaminated with sulfate-reducing bacteria, particularly the species, Desulfovibrio desulfricans. Such sludges or slurries are produced due to scrubbing gases in the stacks of large boilers such as are found in utilities. These large boilers utilize high sulfur fuels such as coal or high sulfur fuel and residual oils.

FGD system sludge contains high concentrations (>10%) of gypsum ($CaSO_4 \cdot 2H_2O$) and calcium sulfite hemihydrate ($CaSo_3 \cdot \frac{1}{2}H_2O$). The lower areas of thickeners and ponds become anaerobic, resulting in an ideal growth environment for sulfate-reducing bacteria of the species *Desulfovibrio*. The growth of Desulfovibrio reduces sulfate and sulfite and evolves hydrogen sulfide ($H_2S$) gas to the atmosphere. Hydrogen sulfide generation is an odor problem even at low levels. The bacteria can also cause corrosion of construction materials. These problems are particularly severe in warm weather, such as in the summer season and much of the year in the southern United States. The use of biocides in actual FGD systems has been rather rare.

Often times, this industrial sludge contains sulfate-reducing bacteria in quantities greater than 100 colonies per ml. This means that sulfate-reducing bacteria controlling biocides are ineffective or require such large dosages as to be impractical.

The use of sodium nitrate to control sulfide odors in various types of sewage wastes has been known for many years. When nitrates are present sulfate-reducing bacteria use nitrate as the terminal electron acceptor instead of sulfate. Consequently, hydrogen sulfide is not produced. However, in order to control the high level of sulfate reducers found in sewage wastes, the amount of nitrate required often becomes cost-prohibitive.

Due to the large volume of liquid involved in flue gas desulfurization sludges, as well as the large amount of sulfate-reducing bacteria, control of the bacteria and the corresponding sulfide odors produced thereby is difficult. The use of conventional non-oxidizing biocides is marginal because high dosages of the biocides are required to give adequate biological and odor control.

If it were possible to provide a biocidal composition that was inexpensive, was easy to apply and would provide long-term control of sulfate reducing bacteria and odors in FGD systems, an advance in the art would be afforded.

THE INVENTION

The invention comprises a method for controlling the growth of sulfate-reducing bacteria and odors produced thereby in FGD scrubber sludges which comprises treating these sludges with a biocidal and odor controlling dosage of an alkali metal nitrite.

While any alkali metal nitrite may be used such as sodium, potassium or ammonium, which later term is considered as alkali metal, it is preferred to use the readily available and inexpensive sodium nitrite for best results.

DOSAGE

The alkali metal nitrite is applied at a dosage of at least 50 ppm with a dosage of 100–500 ppm being preferred when the sulfate-reducing count is less then 100 colonies per ml. When the count is higher, than the dosage and the alkali metal nitrite should be about 100–1,000 ppm by weight of the total FGD system.

TEST METHOD

Various concentrations of sodium nitrite and sodium nitrate were added to 250 milliliters of FGD scrubber sludges. The sludge contained very low sulfate-reducing bacteria counts and no hydrogen sulfide at the start of the tests. The tests were incubated at 37° C. A sulfate-reducing media was used to determine sulfate-reducing bacteria counts. A Hach hydrogen sulfide test kit was used to determine the concentration of hydrogen sulfide gas formed. Sample dilutions were used to detect $H_2S$ levels greater than 5 ppm.

RESULTS AND DISCUSSION

The treated sludges were incubated for 12 days at which time sulfate-reducing bacteria counts and hydrogen sulfide concentrations were determined.

As shown in Table I, 200, 100 and 50 ppm sodium nitrite were inhibitory and demonstrated excellent control of both sulfate-reducing bacteria and hydrogen sulfide for a period of 12 days. Twenty-five ppm sodium nitrite was not inhibitory to the sulfate reducers but controlled the level of $H_2S$ to 200 ppm (no treatment was 1,000 ppm). The 200 ppm $H_2S$ apparently formed when the nitrite was depleted.

Two-hundred ppm sodium nitrate showed poor control over the production of $H_2S$ for the 12 day test period. This was probably due to the complete loss of nitrate prior to the conclusion of the test.

After the 12 day test period (and a subsequent 3 day incubation period) tests 7 through 12 were retreated, this time, only with sodium nitrite, see Table II. Excellent control of sulfate reducers and $H_2S$ was achieved with 100 ppm sodium nitrite and good control with 50 ppm after 72 hours contact time.

TABLE I

| | TWELVE DAY RESULTS | | | | | | | | | | | | |
|---|---|---|---|---|---|---|---|---|---|---|---|---|---|
| TEST NUMBER | 1 | 2 | 3 | 4 | 5 | 6 | 7 | 8 | 9 | 10 | 11 | 12 | CONTROL |
| ZERO HOUR TREATMENT (PPM) | | | | | | | | | | | | | |
| Na $NO_2$ | 200 | 100 | 50 | 25 | 10 | 5 | 0 | 0 | 0 | 0 | 0 | 0 | — |
| Na $NO_3$ | 0 | 0 | 0 | 0 | 0 | 0 | 200 | 100 | 50 | 25 | 10 | 5 | — |
| TOTAL COUNT | | | | | | | | | | | | | |
| Sulfate Reducers | 0 | 200 | $3 \times 10^4$ | $1 \times 10^6$ | $1 \times 10^6$ | $1 \times 10^6$ | $1 \times 10^6$ | $1 \times 10^6$ | >$10^6$ | >$10^6$ | >$10^6$ | >$10^6$ | >$10^6$ |
| $H_2S$ (ppm) | 0 | 0 | 1 | 200 | 400 | 400 | 400 | 600 | N.D. | N.D. | N.D. | 500 | 600 | 1000 |
| $H_2S$ Odor | None | None | None | 0–1 | 1 | 2 | 3 | 3 | 3 | 3 | 3 | 3 | 3 |

TABLE I-continued

TWELVE DAY RESULTS

| TEST NUMBER | 1 | 2 | 3 | 4 | 5 | 6 | 7 | 8 | 9 | 10 | 11 | 12 | CONTROL |
|---|---|---|---|---|---|---|---|---|---|---|---|---|---|
| Sludge Color | Tan | Tan | Tan | Light Gray | Light Gray | Light Gray | Gray | Gray | Gray | Gray | Gray | Gray | Gray |

0 = None
1 = Slight
2 = Moderate
3 = Strong
4 = Very Strong

TABLE II

(72 HOUR RESULTS)

| TEST NUMBER | 7 | 8 | 9 | 10 | 11 | 12 | CONTROL |
|---|---|---|---|---|---|---|---|
| Sodium Nitrite (ppm) | 1000 | 500 | 100 | 50 | 25 | 10 | — |
| PPM $H_2S$ Before Treatment | 1000 | 1000 | 1000 | 1000 | 1000 | 1000 | 1000 |
| PPM $H_2S$ After treatment | 100 | 200 | 300 | 400 | 500 | N.D.* | 1000 |
| Sulfate Reducers Before Treatment | $>10^6$ | $>10^6$ | $>10^6$ | $>10^6$ | $>10^6$ | $>10^6$ | $>10^6$ |
| Sulfate Reducers After Treatment | <100 | <100 | <100 | $2 \times 10^4$ | $>10^6$ | $>10^6$ | $>10^6$ |

*N.D. = Not Determined

CONCLUSIONS

Sodium nitrite demonstrated excellent control of sulfate-reducing bacteria and prevented the biogenic production of $H_2S$ in a mildly contaminated FGD sludge. After 12/days a sample treated with 50 ppm sodium nitrite contained $3 \times 10^4$ sulfate reducers and 1 ppm $H_2S$ as compared to $1 \times 10^6$ sulfate reducers and 1,000 ppm $H_2S$ in the untreated contol.

Sodium nitrite demonstrated excellent control of sulfate reducers and $H_2S$ in a heavily contaminated FGD sludge. Three days after being treated with 100 ppm sodium nitrite, the sulfate reducers were reduced by 99.9% and the $H_2S$ by 70%.

Sodium nitrate failed to control the sulfate reducers and $H_2S$ production in FGD sludge at 200 ppm for 12 days.

Having thus described our invention, we claim:

1. A method for controlling the growth of sulfate-reducing bacteria including Desulfovibrio desulfricans and odors including $H_2S$ produced thereby in flue gas desulfurization scrubber sludges which comprises treating these sludges with a biocidal and odor controlling dosage of an alkali metal nitrite in an amount of at least about 50 ppm, to control the growth of said sulfate reducing bacteria and prevent the biogenic production of said $H_2S$.

2. The method of claim 1 wherein the alkali metal nitrite is sodium nitrite.

3. The method of claim 1 wherein the sulfate-reducing bacteria population is greater than 100 colonies per ml.

* * * * *